United States Patent
Awasthi et al.

(10) Patent No.: US 7,774,757 B1
(45) Date of Patent: Aug. 10, 2010

(54) DYNAMIC VERIFICATION OF APPLICATION PORTABILITY

(75) Inventors: Vikas Awasthi, Bangalore (IN); Sanjeeb K. Sahoo, Bangalore (IN)

(73) Assignee: Oracle America, Inc., Redwood City, CA (US)

( * ) Notice: Subject to any disclaimer, the term of this patent is extended or adjusted under 35 U.S.C. 154(b) by 1339 days.

(21) Appl. No.: 11/180,411

(22) Filed: Jul. 13, 2005

(51) Int. Cl.
*G06F 9/44* (2006.01)
(52) U.S. Cl. .................. 717/127; 717/126; 717/129; 717/131; 709/203; 709/217; 709/219; 714/38; 714/48
(58) Field of Classification Search ......... 717/120–135, 717/168–178; 709/217, 219, 203; 714/37–57
See application file for complete search history.

(56) References Cited

U.S. PATENT DOCUMENTS

| | | | |
|---|---|---|---|
| 5,583,983 A * | 12/1996 | Schmitter | 717/138 |
| 5,901,315 A * | 5/1999 | Edwards et al. | 717/124 |
| 5,999,728 A * | 12/1999 | Cable | 717/105 |
| 6,081,665 A * | 6/2000 | Nilsen et al. | 717/116 |
| 6,910,208 B1 | 6/2005 | Zimniewicz | |
| 2002/0133501 A1* | 9/2002 | Raduchel et al. | 707/102 |
| 2003/0110313 A1* | 6/2003 | Dochez et al. | 709/328 |
| 2003/0208685 A1 | 11/2003 | Abdel-Rahman | |
| 2004/0243881 A1* | 12/2004 | Wang et al. | 714/37 |

OTHER PUBLICATIONS

Portable applications in current computing [Java], Janecek, J., IEEE, Sep. 7-9, 1997, pp. 104-105.*
A new development framework based on efficient middleware for real-time embedded heterogeneous multicomputers, Janka, R., IEEE, Mar. 7-12, 1999, pp. 261-268.*
Software portability in open architectures, Mosbeck, R.A.; Reeve, L.C.; Thedens, J.R., IEEE, vol. 2 Oct. 2001, pp. 9E1/1-9E1/8.*
Java™ 2 Platform Enterprise Edition Specification, v1.4, Shannon, Sun microsystems Inc., Nov. 24, 2003, pp. 13-231.*
Mooney, Issues in the Specification and Measurement of Software Portability; 1993; Obtained from http://www.cs.wvu.edu/~jdm/research/portability/reports/TR_93-6.html#RTFToC1; pp. 1-22.*
Bill Shannon; "Java™ 2 Platform Enterprise Edition Specification, v1.4"; Sun Microsystems, Inc.; Nov. 24, 2003; pp. 5-22; Santa Clara, California, U.S.A.
"Java™ AVK for the Enterprise: Testing J2EE™ Applications for Portability", Technical White Paper; Apr. 2004, 16 pages; Santa Clara, California, U.S.A.
"Java™ Application Verification Kit (AVK) for the Enterprise", printed from the internet: http://web.archive.org/web/20050319020757/http://java.sun.com/j2ee/avk/, Sun Microsystems, Inc., 2 pages.

(Continued)

*Primary Examiner*—Wei Y Zhen
*Assistant Examiner*—Satish Rampuria
(74) *Attorney, Agent, or Firm*—Robert C. Kowert; Meyertons, Hood, Kevlin, Kowert & Goetzel, P.C.

(57) ABSTRACT

A system and for dynamic verification of application portability may include an application server configured to support a debugging interface, an application deployed on the application server, and a portability verification tool. The portability verification tool may be configured to invoke the debugging interface during an execution of the application to determine whether the application violates one or more specified portability criteria during the execution.

20 Claims, 7 Drawing Sheets

OTHER PUBLICATIONS

"Migrating and Redeploying Server Applications Guide," Sun ONE Application Server, Version 7, Update 1, Mar. 2003, Chapter 3, pp. 115-142.

Radim Kubacki, "Classclosure," printed from the internet: http://www.netbeans.org/servlets/ReadMsg?msgId=229592&listName=contrib, Jan. 11, 2002, 1 page.

* cited by examiner

DYNAMIC VERIFICATION OF APPLICATION PORTABILITY

BACKGROUND OF THE INVENTION

1. Field of the Invention

The present invention is directed to computer systems. More particularly, it is directed to verification of portability of computer system applications.

2. Description of the Related Art

The complexity and expense of developing and deploying enterprise-level computer systems applications has been increasing over time. In addition to supporting a rich set of functional features, a modern enterprise application may also have to be scalable enough to support large numbers of concurrent users, and provide a high level of availability, maintainability and interoperability with other applications. The development cycle for a single major release of an application may take months or even years, and may require hundreds of person-years of development resources. As a result, enterprise application vendors are understandably eager to reduce the total cost of application development.

In the past, application vendors often developed a first version of an enterprise application for a particular execution platform (e.g., a combination of a computer hardware architecture and an operating system designed for the hardware architecture), and then ported the application to other execution platforms as needed. Each ported version of the application typically went through a quality assurance test cycle on the corresponding platform. Quality assurance testing, during which the functionality, performance and other features of the enterprise application are tested, often represents a substantial portion of the total expense of application development. In order to reduce porting and testing costs, and also in response to growing customer demand for applications that can be deployed across a variety of hardware architectures and operating systems, in recent years many application vendors have begun to target their applications to application server environments (such as the Java 2 Enterprise Edition (J2EE™) environment) that are intended to be platform-agnostic. Typically, a standards organization (or a collaborative body such as the participants in the "Java Community Process" in the case of J2EE™) is responsible for defining standards for the application server technology in the form of formal specification documents. The specification documents define the functionality and interfaces that must minimally be supported for compliance with a particular version of the application server technology. As application server is typically designed and advertised as being compliant with a particular version of an application server technology, and potential users and developers may consult the specifications associated with that version to determine the set of features supported by the application server. Applications developed in accordance with a particular version of a specification are expected, in principle, to be deployable without modification at any application server that conforms to that version of the specification, regardless of the specific operating system or hardware architecture of the platform on which the application server is executed. Thus, once an application vendor has developed and tested such a portable application on an application server on one platform, no further source code changes should be required to deploy the application on other platforms, and the application vendor should also be able to reduce or eliminate additional testing required for the other platforms.

Unfortunately, application servers provided by different application server vendors may differ slightly in the set of functions and features provided, even where the different application server vendors claim compatibility with the same set of specifications. For example, the specifications may allow optional features to be implemented, and different application server vendors may implement different sets of optional functions. As a result, an application developed on a particular application server may sometimes use features such as application programming interfaces (APIs) that are vendor-specific, and hence may not be truly portable. Also, portability may require compliance with certain standards for run-time behavior, e.g., standards relating to exception handling. Traditional tools for identifying non-portable features of applications may require access to application source code, changes to application server code, restarts of application servers to initiate or terminate portability analysis, and/or cumbersome modifications to an application server runtime environment, which may be difficult to accomplish for application developers and potential customers. In addition, portability criteria may change over time (e.g., as standards or specifications change), and traditional portability verification tools may themselves require source code modifications to adapt to changes in portability criteria.

SUMMARY

Various embodiments of a system and method for dynamic verification of application portability are disclosed. According to a first embodiment, a system may include an application server configured to support a debugging interface, an application deployed on the application server, and a portability verification tool. The portability verification tool may be configured to invoke the debugging interface during an execution of the application to determine whether the application violates one or more specified portability criteria during the execution. For example, in one embodiment the application may be considered non-portable if it utilizes an interface(s) to an application server service(s) (e.g., services that are not implemented within the application itself, but are typically supported by an application server, such as transaction services, security services, messaging services etc.) that are not required by or defined in an application services standard specification. The debugging interface may support a function that notifies the portability verification tool when specified types of events (e.g., exceptions) occur during application execution, and the portability verification tool may be configured to use the notifications to identify instances of non-portable behavior (e.g., when a "ClassNotFound" exception occurs as a result of the application attempting to access a non-standard interface or object class). Such a use of a debugging interface may allow application portability to be verified, for example, without modifying the application server code or the application code, without installing an additional portability-verifying application at the application server, and without requiring cumbersome changes in the run-time execution environment of the application server. In some embodiments, the debugging interface may be platform-independent, allowing the application server and the portability verification tool to be executed on computer hosts employing different processor architectures and/or operating systems.

A number of different types of portability criteria may be specified in various embodiments, for example based on specific versions of enterprise application execution technologies such as J2EE™. In one embodiment, an application may be deemed non-portable if a particular type of event, such as an unchecked exception or an exception of a particular object class, occurs during the execution. The debugging interface may support a number of different functions, such as functions allowing monitoring of exceptions and other events such as function invocation (e.g., method entry) during application execution. The portability verification tool may be configured to invoke one or more such functions, and to make a determination that the application is non-portable if an event of a particular type identified as being non-portable occurs. The portability verification tool may also be configured to generate a portability verification report that identifies any instances of non-portable behavior detected during the application execution. In some embodiments, the tool may also be configured to generate a code coverage report, which may for example indicate the fraction of the application's defined functions or methods that were actually called during the execution, and/or may identify the set of functions that were actually called (or identify the set of functions that were not called). In one embodiment, the portability verification tool may also be configured to dynamically identify at least one portability criterion, e.g., via a parameter file.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Figure 1:
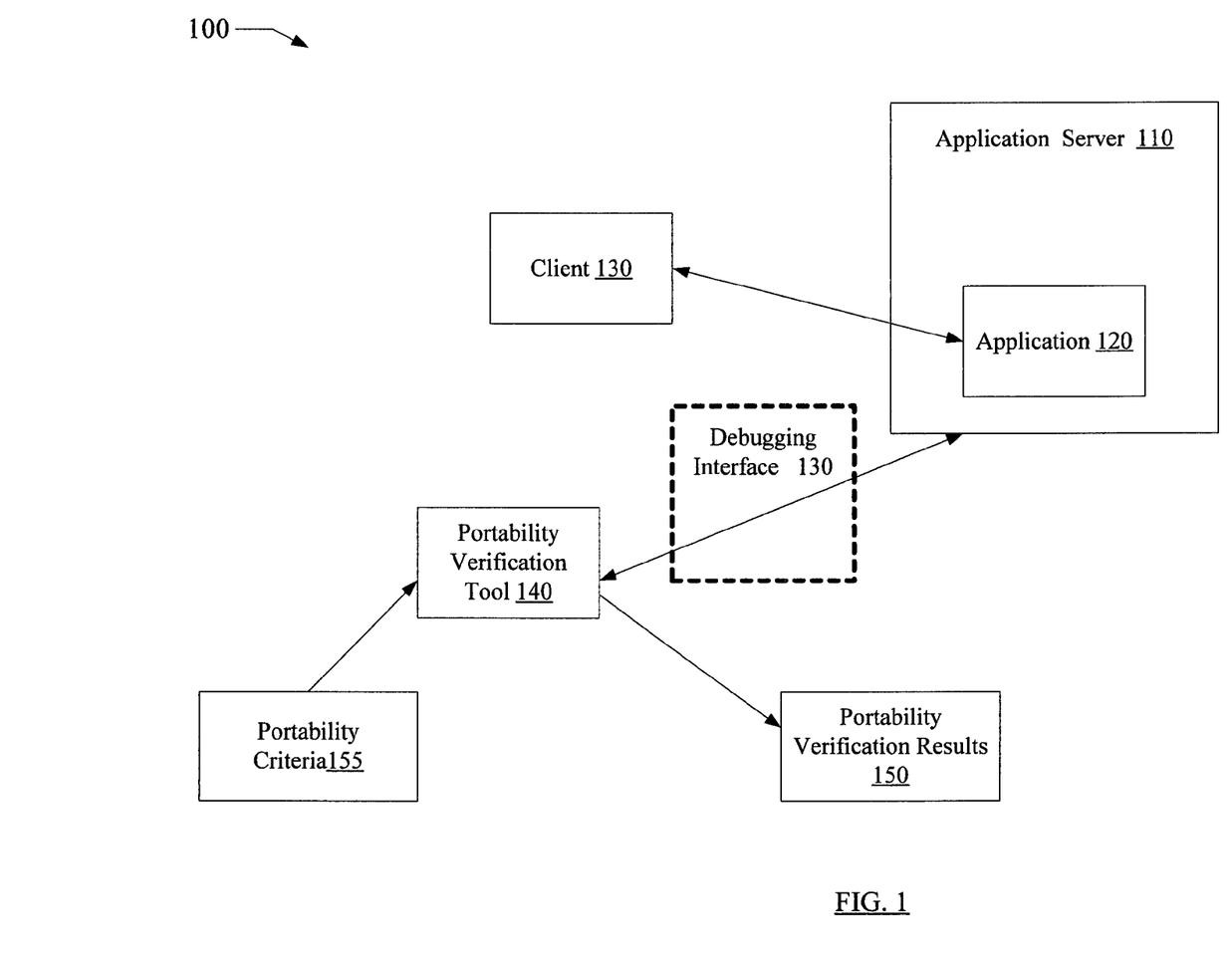
FIG. 1 is a block diagram illustrating one embodiment of a system.

FIG. 1 is a block diagram illustrating one embodiment of a system 100. The system includes an application server 110 configured to support a debugging interface 130, an application 120 deployed on the application server, and a portability verification tool 140. Portability verification tool 140 may be configured to invoke the debugging interface 130 during an execution of the application 120 (e.g., during a test in which a client 130 exercises the functionality of the application) to determine whether the application violates one or more specified portability criteria 155 during the execution. For example, in one embodiment the application 120 may be considered non-portable if it utilizes interfaces to application server services (e.g., services that are not implemented within the application itself, but are typically supported by an application server, such as transaction services, security services, messaging services etc.) that are not required by or defined in an application services standard specification. Non-standard features may be introduced into application 120 for various reasons—e.g., to provide enhanced functionality (such as nested transaction services, or specific types of messaging services) that is not required by a standard specification, to ease application development (e.g., using non-standard wrapper interfaces), or simply because an application developer was not aware of the portability implications of doing so. Non-standard application server service interfaces may be supported by various application server vendors, but an application 120 that relies on non-standard interfaces or services may not run successfully on an application server that adheres more strictly to the standard specifications, or on an application server that supports a different set of non-standard service interfaces, and thus may be considered non-portable in some embodiments. Other types of portability criteria may be specified in some embodiments, as described below in further detail.

In one specific embodiment, the application server 110 may provide a reference implementation of a particular application services standard specification, such as a J2EE™ specification. A reference implementation is an implementation of a standard that adheres strictly to the requirements defined in the standard, and does not implement any non-standard features that are not required by the standard. If an application 120 deployed to such an application server 110 attempts to invoke a non-standard application server service, the application server may throw an exception of a particular category. For example, if the application was developed on an application server that provided support for vendor-specific object classes, and one or more vendor-specific object classes were referenced in the application, a "ClassNotFound" exception may be thrown when the application is executed on an application server providing a reference implementation of the standard. The "ClassNotFound" exception may indicate that the vendor-specific object class could not be found in the set of classes accessible from the application (e.g., the set of classes, including application server-provided classes, that may be located using a "class path" associated with the application). In some embodiments, the debugging interface 130 may support a function that allows portability verification tool 140 to monitor the application execution for specified categories of exceptions, e.g., including "ClassNotFound" exceptions. Portability verification tool 130 may be configured to invoke one or more such functions provided by debugging interface 130 to track the occurrence of exceptions that indicate non-portable behavior in such embodiments. At the end of the execution, the portability verification tool 140 may be configured to generate a report including portability verification results 150 for the execution. The results 150 may be provided to various parties interested in ensuring that the application 120 is portable, for example, to potential customers who do not wish to be dependent on a particular application server vendor's non-standard features, or to application developers or development managers who may wish to ensure that non-standard features have not been introduced into the application source code. The use of the debugging interface 130 may allow portability verification to be performed without requiring source code changes at the application server 110 or the application 120, restarting the application server, or modifying runtime environment variables of the application server (e.g., class paths). In addition, in some embodiments portability verification tool 140 may be executed within a separate process, or even at a different host, than application server 110, thus minimizing the impact of portability verification testing on the application 120.

Figure 2:
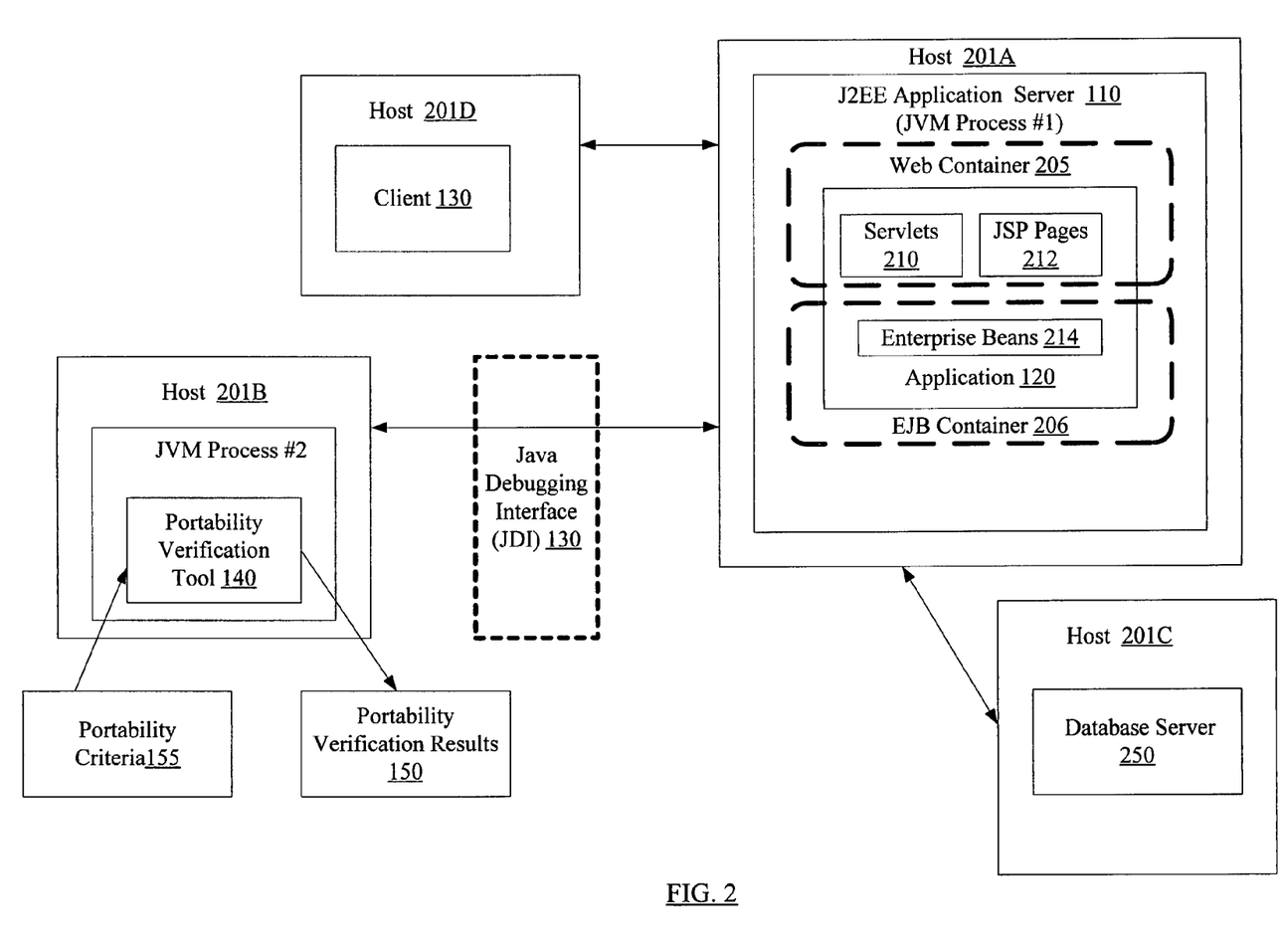
FIG. 2 is a block diagram illustrating an embodiment where an application server uses J2EE™ technology.

Application server 110 may be any type of execution environment designed to allow applications 120 to be developed and deployed, e.g., independently of the details of hardware architectures and operating systems, and may be implemented using any of a variety of technologies in various embodiments. Application server 110 may be configured to provide a variety of application server services, e.g., services that implement commonly-used functionality that may be useful to a variety of deployed applications, such as transaction services, security services, connection pooling services, messaging services, etc. Various applications 120 may utilize the specific sets of application server services that they require, and application developers may simply employ the services provided by the application server without re-implementing them for each individual application. In one embodiment, as shown in FIG. 2 and described in further detail below, application server 110 may be configured to utilize J2EE™ technology; in other embodiments, other technologies such as .NET may be employed. Debugging interface 130 may provide a number of different debugging functions or methods that may be invoked by portability verification tool 140 (or by any other client of the interface) in various embodiments. For example, in one embodiment the debugging interface may allow a user to identify the specific application and application server functions or methods that are entered and/or exited during application execution, to monitor the occurrence of certain types of run-time events that may occur during the application execution (such as exceptions and errors), to set and reset break points in the application code, to examine the values of various application or application server variables, etc. In some embodiments, the debugging interface 130 may be platform-independent, in that it may be invoked from any computer system (such as a workstation or server supporting Java™ virtual machines) that complies with specified standards. For example, in one embodiment, the debugging interface 130 may be a version of the Java Debugging Interface (JDI), application server 110 may be executing on a computer server employing SPARCT™-based processors provided by Sun Microsystems and a Solaris™ operating system, and portability verification tool 140 may be configured to invoke the debugging interface 130 from a workstation employing Intel processors and a Windows™ operating system. In other embodiments, the portability verification tool 140 and the application server may be configured to run within separate processes or virtual machines on the same server, or even within the same process at a particular server.

Any type of application 120 (or a portion of a multi-tiered application) that is deployable on the application server 110 may be checked for portability according to specified portability criteria 155 in various embodiments. Application 120 may invoke both internal functions (e.g., functions defined and implemented within the application or in shared libraries bundled within a deployed version of the application), as well as external functions that may not be implemented within the application (e.g., the common functions or services that may be provided by the application server and utilized by a variety of applications as described above, such as transaction management functions, security-related functions, connection pooling functions, messaging functions etc.) As noted earlier, portability criteria 155 may be derived, for example, from a version of a standard or specification (e.g., an API specification) associated with a particular application execution technology such as J2EE™: e.g., an application that invokes an external function that is not a requirement or recommendation of a particular version of the specification may be considered non-portable with respect to that version of the specification. Application 120 may be a multi-tiered commercial application such a web-based electronic commerce system, for example, some of whose components may be executed outside application server 110 (e.g., at one or more web servers and/or back-end database servers), or a single-tiered application such as a simulation tool. In some embodiments, an external client 130 (e.g., a set of web-based interactive scripts implemented using a load generation tool) may be used to exercise application 120, while in other embodiments, the functionality of application 120 may be exercised without requiring interaction with external processes or clients, e.g., using input parameter files. In various embodiments, application 120, application server 110, client 130 and portability verification tool 140 may each be implemented using any desired combination of programming languages and/or scripting languages.

FIG. 2 is a block diagram illustrating a specific embodiment where application server 110 uses J2EE™ technology, and debugging interface 130 is a version of the Java Debug Interface (JDI). J2EE™ application server 110 may be compliant with a particular version of a J2EE™ specification (or a set of specifications for various subcomponents of the application server), which defines the minimum set of functionality and the interfaces supported by the application server. As shown, J2EE™ application server 110 may be incorporated within a first Java Virtual Machine (VM) process at a first computer host 201A, and portability verification tool 140 may be incorporated within a second VM at a second host 201B. In some embodiments, application 120 may access a back-end database server 250, which may be incorporated at a host 201C, and client 130 may be incorporated at another host 201D. Hosts 201A-201D may all be linked to a single network in some embodiments, while in other embodiments, independently configurable and/or isolatable networks may be used to link the various hosts shown in FIG. 2. It is noted that in some implementations, the J2EE™ application server 110 and one or more of the other components illustrated in FIG. 2, such as portability verification tool 140, client 130 and/or database server 250 may be incorporated within a single host 201, or even within a single VM process.

J2EE™ technology provides a component-based approach to the design, development, assembly and deployment of enterprise applications. Multi-tiered distributed applications built using reusable components may be supported in a J2EE™ environment. Logic for a multi-tiered application may be divided into components according to function, and the various application components may be installed within different hosts, depending on the tier to which the component belongs. For example, a multi-tier application may include a client tier, a web tier, a business tier and/or an enterprise information system (EIS) tier. Client-tier components may include web clients, applets, and/or application client programs 130 configured to run at a client host 201D. Web tier components may include, for example, Java Servlets 210 and JavaServer Pages (JSP™) 212. Business tier components may include, for example, enterprise beans 214, which may include session beans, entity beans and/or message-driven beans. An EIS tier may include, for example, database servers 250, enterprise resource planning (ERP) systems, mainframe-based transaction processing systems, and other legacy applications.

An application server 110 may implement a number of different types of containers to provide access to various objects and to provide interfaces to support the application server services described above, as well as for other functions such as multithreading, state management and the like. Before an application component is executed, it may have to be assembled into a module and deployed within an appropriate container. For example, in a J2EE™ environment, a web component may be assembled into a J2EE™ web module and deployed into a web container 205, and an enterprise bean may be assembled into a J2EE™ EJB module and deployed into an EJB container 206. The assembly process may involve specifying container settings for each component in a J2EE™ application 120, and for the application 120 itself. The container settings customize the underlying support services to meet the specific needs of the component. For example, J2EE™ security model settings may be used to ensure that system resources are accessed only by authorized users; J2EE™ transaction model services may be used to specify relationships among methods that make up a single logical transaction, and so on. Since the J2EE™ architecture provided configurable services, application components within the same application 120 can behave differently depending on where they are deployed. For example, security settings for an enterprise bean, which may control the level of access from the application 120 to a database server 250, can be modified from one production environment to another. An architecture such as J2EE™ provides an environment for developing a complex application once in accordance with a particular set of J2EE™ standard specifications, and then deploying the application (using flexible and configurable deployment settings) as often as needed at any application server that supports the same set of specifications.

In some embodiments, various subcomponents, facilities and/or services supported by an application server 110 may each have associated standards or specifications—for example, EJB container 206 may have an associated standard specification, web container 205 may have its own associated standard specification, and even debugger interface 130 may have its own standard specification. In some such embodiments, a combination of standard specifications for subcomponents of the application server environment may be combined to form a higher-level specification. When verifying the portability of an application 120 with respect to the higher-level specification, portability verification tool 140 may have to take the specifications for each subcomponent into account, e.g., by using a first set of portability criteria for the application's web module deployed to web container 205, and using a different set of portability criteria for the application's EJB module deployed to EJB container 206.

Figure 3:
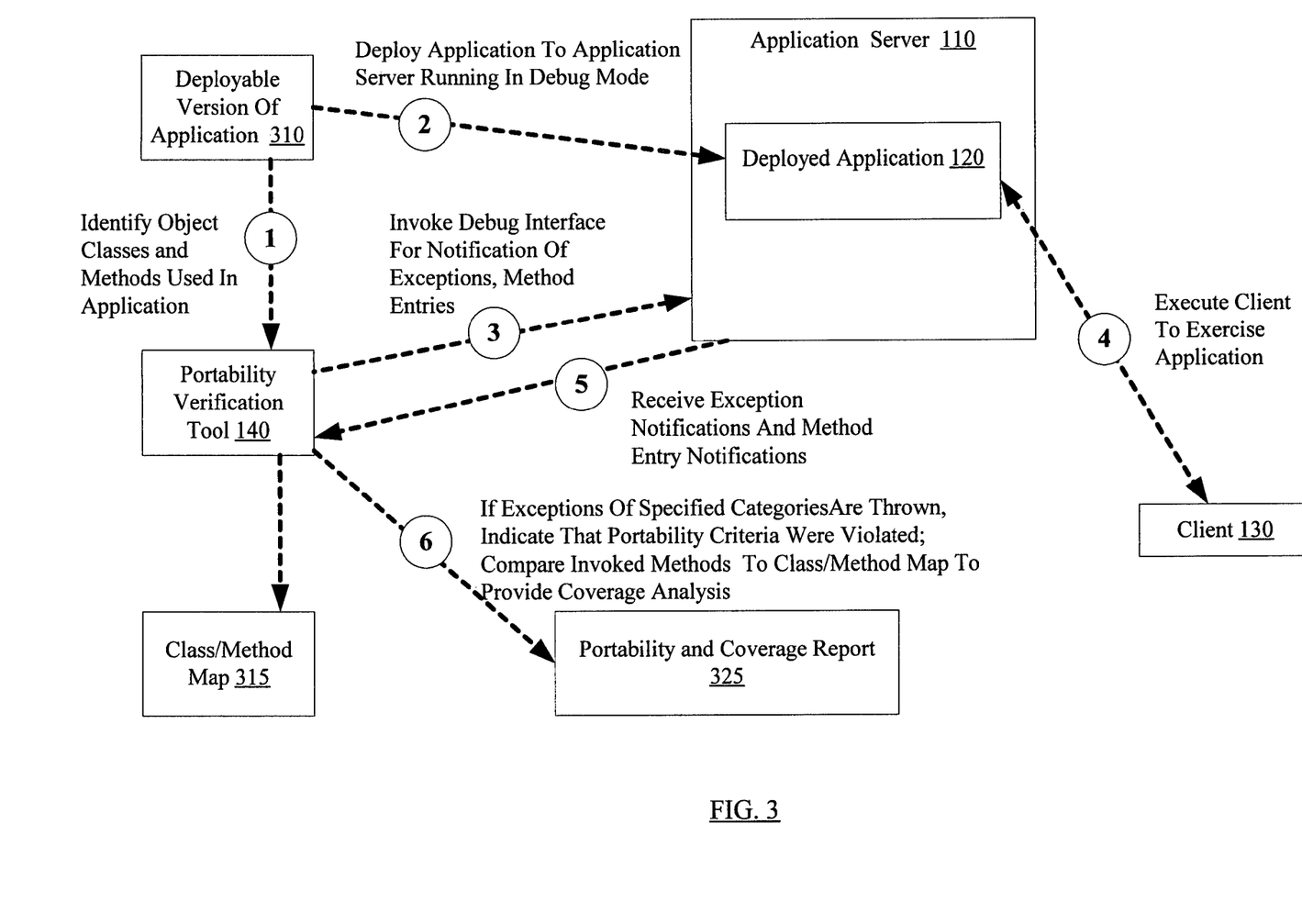
FIG. 3 is a block diagram illustrating aspects of the functionality of a portability verification tool, according to one embodiment.

FIG. 3 is a block diagram illustrating aspects of the functionality of portability verification tool 140, according to one embodiment. Portability verification tool 140 may be configured to examine a deployable version of an application 310 to identify the object classes and methods or functions defined in the application, as indicated by the arrow labeled "1" in FIG. 3. A map 315 identifying the specific methods called from each identified class may be prepared by portability verification tool 140. In some embodiments, map 315 may be used to keep track of the extent to which the code of the application was exercised during a particular execution during which the application was checked for non-portability, and a corresponding code coverage report may be generated at the end of the execution, as described below in further detail. In other embodiments, the map 315 may instead or also be used for other purposes—e.g., to help design client 130 to thoroughly test the application. The object classes and methods may be identified using a variety of different techniques in different embodiments. For example, in one embodiment where the application is developed using a programming language (such as Java) that supports a reflection API allowing a programmatic examination of classes, methods etc. that are referenced and/or defined within a given class, the reflection API may be used to identify the methods and classes used in the application. In another embodiment, at least some of the classes and methods may be determined by examining metadata (such as a deployment descriptor) that may be included in a deployable version of the application 310 (e.g., in an "ear" (enterprise archive) file, a "jar" (Java archive) file, etc.). In one implementation, a deployment descriptor included in deployable version 310 of the application may include a list of top-level classes defined in the application, and other classes referenced by the top-level classes may be determined using a reflection API. In one embodiment, a list of classes and/or methods of the application may be provided to portability verification tool 140 as input, e.g., via an input parameter file prepared by an application developer or derived from an analysis of the application source code.

In one embodiment, portability verification tool 140 may also be configured to dynamically obtain input specifying one or more portability criteria 155, e.g., from an input parameter file or via manual input. That is, in such an embodiment, the portability verification tool 140 may provide an interface to specify a portability criterion without requiring a modification of the source code of the tool 140. An input parameter file may be used to specify, for example, categories of exceptions, errors or other events whose occurrence may result in a designation of an application as being non-portable. For example, as described earlier, if the application server 110 adheres strictly to an application service standard (e.g., if the application server provides a reference implementation of the standard), a "ClassNotFound" exception or its equivalent may be thrown if the application attempts to access a class or a service not required by the standard, and such an exception may be an indication of non-portability. Any desired format may be used to provide the parameters, e.g., the input parameter file may be a text file with a list of exception types or other rules, a file formatted using XML (Extensible Markup Language), or formatted according to a custom language or syntax for specifying portability criteria. In addition to event-based portability criteria (e.g., criteria based on exceptions, errors etc.) a variety of other types of portability criteria 155 may be specified in various embodiments—e.g.; in some embodiments, a reference to a certain specific object class from another specific object class may be considered a portability violation, or a violation of a recommended coding style or methodology (e.g., a naming convention for objects, classes or methods) identified in a standard specification may be considered a portability violation. In some embodiments, different sets of portability criteria may be specified for different containers within an application server: for example, certain types of exceptions such as "EJBExceptions" may be considered portable if thrown within an EJB container 206 of a J2EE™ application server, but may be considered non-portable if thrown within a web container 205. Portability criteria may be hard-coded within portability verification tool 140 in some implementations.

In one specific embodiment where an occurrence of a particular category or class of exceptions is considered a portability violation, an exclude list of exceptions may also be provided as input to portability verification tool 140, to indicate specific subclasses or instances of exceptions that are not to be considered as violating portability. If a specific exception that appears to belong to a portability-violating category of exceptions occurs, portability verification tool 140 may be configured to check whether the specific exception is identified within the exclude list, and to determine that that specific exception violated portability criteria only if it is not listed in the exclude list. For example, according to one set of portability criteria 155 in one implementation, occurrences of unchecked exceptions in general may be considered indications of non-portability, but a specific unchecked exception such as a null pointer exception may not be considered non-portable, and may be specified in an exclude list. In general, unchecked exceptions may include exceptions that do not have to be declared in method signatures, and for which exception handlers may not have to be provided in the application code. Unchecked exceptions may represent a subclass of a defined higher-level exception class in some embodiments. In embodiments where the Java programming language is employed, for example, an unchecked exception is a subclass of the java.lang.RuntimeException class. Since the occurrence of unchecked exceptions such as ClassNotFound, IllegalArgument exceptions etc. may in general be unpredictable, and such exceptions may be thrown from a large number of locations in the application code, compilers may be configured not to require that declarations of the unchecked exceptions be provided in the method signatures in some embodiments. In addition, explicit exception handlers for unchecked exceptions may also not be required in such embodiments. The occurrence of an unchecked exception may have unpredictable, platform-dependent results in some embodiments. If a null pointer exception occurs during application execution in such an implementation, the portability verification tool 140 may be configured to exclude the occurrence from a list of portability violations, but the occurrence of any other unchecked exception may be considered a portability violation.

As indicated by the arrow labeled "2" in the embodiment shown in FIG. 3, after the class/method map 315 has been generated, the application may be deployed to an application server 110. In one embodiment, the application server may have been started in debug mode prior to the deployment of the application. In one implementation, a runtime parameter or an environment variable setting may be used to enable debug-mode operation of application server 110, while in other implementations, no runtime parameters or changes to environment variable settings may be required. In some embodiments, the application 120 may be compiled using a debug flag (such as a "-g" flag) to support the use of debugging interface 130, while in other embodiments, such flags may not be required during application compilation. In the embodiment depicted in FIG. 3, portability verification tool 140 may be configured to invoke one or more methods or functions of the debugging interface 130 to enable notification of function invocations (e.g., notifications when specified methods are entered) and the occurrence of events such as exceptions during the execution of application 120, as indicated by the arrow labeled "3".

For example, in one implementation where a version of JDI is being used, the debugging interface 130 may specify a collection of specific programming interfaces, such as a MethodEntryRequest interface, a MethodExitRequest interface, and an ExceptionRequest interface. An invocation of the MethodEntryRequest interface may allow portability verification tool 140 to request to be notified (e.g., by the application server 110 placing a MethodEntryEvent object in an event queue accessible by the portability verification tool) when a specified method is entered by the application 120. An implementation of the MethodEntryRequest interface may, for example, support methods such as addClassFilter(String classPattern) and addClassExclusionFilter(String classPattern) to allow the inclusion or exclusion of specific methods' in a set of methods for which notifications are to be enabled. The classPattern string parameters to such methods may allow the specification of classes, e.g., using regular expressions, whose methods are to be included or excluded. Portability verification tool 140 may use its class/method map 315 to request notifications for only those methods that are defined in the application 120 in some embodiments. In some implementations, portability verification tool 140 may also be configured to invoke one or more interfaces (e.g., a MethodExitRequest interface) to request a notification on an exit by application 120 from a method of a specified set of methods.

Similarly, portability verification tool 140 may also invoke one or more ExceptionRequest interfaces to request notifications of certain types of exceptions or errors during the execution of application 120 (e.g., by the application server 110 placing an ExceptionEvent object in an event queue accessible by portability verification tool 140). Various implementations of the ExceptionRequest interface may also support methods such as, for example, addClassFilter(String classPattern), addClassExclusionFilter(String classPattern), addThreadFilter(ThreadReference thread), addExceptionClassFilter(String classPattern) etc. to specify the kinds of exceptions for which notifications are to be generated (e.g., based on a class in which the exception occurs, or a thread of execution in which the exception occurs, or a class to which the exception belongs). In some embodiments, portability verification tool 140 may be configured to use one or more such methods to restrict the set of exceptions for which notifications are generated, while in other embodiments, portability verification tool 140 may be configured to receive notifications for all exceptions, and to analyze the notifications to determine whether any specific exceptions that violate portability criteria occurred during the execution. Thus, in some embodiments, only a subset of the exception notifications may represent portability violations. Exception-related portability criteria may specify categories or types of exceptions (e.g., unchecked exceptions as described above) and/or specific object classes of exceptions whose occurrence may indicate non-portability. It is noted that in other embodiments, where for example the debugging interface 130 may not be a version of JDI, functionality similar to that described above for JDI (e.g., functionality for generating notifications when certain types of events of interest occur, such as function invocations and/or exceptions) may be provided using other APIs or techniques.

As described earlier, in some embodiments, a portability criterion 155 may include a requirement that no unchecked exceptions should be thrown by an application 120, i.e., that if the application 120 throws an unchecked exception, the application should be considered non-portable. In some embodiments where an occurrence of an unchecked exception is considered an indication of non-portability, portability verification tool 140 may be configured to set up exception notifications specifically for unchecked exceptions. In other such embodiments, portability verification tool 140 may be configured to receive notifications for all exceptions that occur in the application classes of interest, and identify specific types of exceptions that indicate non-portability using information contained in the notification, such as an exception stack trace. For example, an exception stack trace may indicate that the corresponding exception belongs to a specific class of exceptions (e.g., the Java.lang.RunTimeException class, or its subclasses, for Java applications) that are unchecked exceptions.

After the requests for notifications have been set up by portability verification tool 140 using debugging interface 130, the application 120 may be exercised by client 130, as indicated by the arrow labeled "4" in FIG. 3. The client 130 may be configured to issue a series of requests to application 130 and receive responses to those requests. If application 120 is an electronic banking application, for example, client 130 may be configured to issue multiple deposit, balance check, withdrawal, and other banking related requests. Client 130 may be multi-threaded in some embodiments, e.g., client 130 may represent or simulate any desired number of concurrent users of application 120. A combination of client programs that may have been developed for functional testing and/or for load testing or performance benchmarking may be used to exercise application 120 in some implementations, in order to thoroughly test as many aspects of the functionality of the application for possible violation of portability criteria 155 as possible. During the execution of the application 120 in response to the client 130, portability verification tool 140 may be configured to receive notifications from the application server 110, in accordance with the invocations of the debugging interface 130 by the portability verification tool 130, as indicated by the arrow labeled "5".

At the end of the execution of the application 120, portability verification tool 140 may be configured to generate a portability and/or coverage report 325 for the execution, as indicated by the arrow labeled "6" in FIG. 3. The report 325 may include information about any violations of portability criteria 155 detected during the execution, e.g., identifications of one or more exceptions that violated the criteria, the corresponding stack trace or other identification of the classes and methods where the exceptions occurred, etc. In some implementations, a list and/or description of the portability criteria 155 may also be included in the report, along with an indication of the source from which the criteria were obtained or derived (e.g., if the criteria were specified in an input parameter file to portability verification tool 140, the name, location and/or contents of the parameter file may be included in the report, or an identification of the particular versions of standard specifications from which the criteria were derived may be included). In addition to an indication of detected portability violations, in some embodiments portability verification tool 140 may also be configured to include code coverage analysis in the report, which may indicate the extent to which the methods and classes defined in the application were exercised during the execution. For example, using class/method map 315 and the notifications received during the execution of the application, portability verification tool 140 may be configured to compute the fraction of classes and methods that were actually referenced or called (e.g., a ratio of the number of methods actually executed to the number of methods identified in the map 315), and/or to list the methods or classes that were not called or referenced during the execution. Various other details may also be included in report 325, such as details of the hardware and software platform used during portability verifications. In some embodiments, a separate report for portability verification and code coverage may be generated.

In one example implementation, for the example, a combined portability and coverage report 325 may be organized into the following sections:

Portability/Coverage Report For Application X, Client Y, On Jun. 1, 2005

I. Portability Criteria

II. Application Server, Hardware and Software Platform Details

III. Client Test Details

IV. Summary Of Detected Portability Violations

V. Summary Of Code Coverage

VI. Details Of Portability Violations

VII. Details Of Code Coverage.

The "Summary Of Detected Portability Violations" section may indicate, for example, how many portability violations occurred during the execution, and if various categories of portability criteria were specified, the number of violations of each category of portability criteria. Similarly, the "Summary of Code Coverage" section may include a statement indicating the fraction of methods of the application that were exercised during the execution, (e.g., "100% of methods were exercised"). Details sections may include information such as stack traces for exceptions, lists of methods called during the execution, lists of methods not called during the execution, etc.

It is noted that in order to increase the probability of finding portability violations, multiple test iterations may be run in some embodiments. That is, client programs 130 may be repeatedly invoked or iterated, especially for applications 120 that support large numbers of users, where concurrent operations on behalf of multiple users may potentially result in race conditions that may lead to non-portable behavior (such as certain types of exceptions being thrown). Since each execution of application 120 may result in different sequences of low-level operations (such as lock acquisitions, I/O operations etc.) at application server 110, repetitive testing may help to identify non-portable run-time behavior that may occur relatively rarely. For example, the same exceptions may not be thrown each time an application is executed, so the application may be executed several times to increase confidence in the portability results. It is noted that the probability of detecting non-portable behavior unrelated to race conditions may also be increased by repeating test iterations in some implementations. It is also noted that in some embodiments, some of the operations depicted in FIG. 3 may be performed in a different sequence than the sequence illustrated in FIG. 3, or omitted entirely. For example, in one embodiment, the identification of the classes and methods defined in an application 120 may be performed after the application 120 is deployed at the application server, and in another embodiment, code coverage reports may not be generated.

Figure 4:
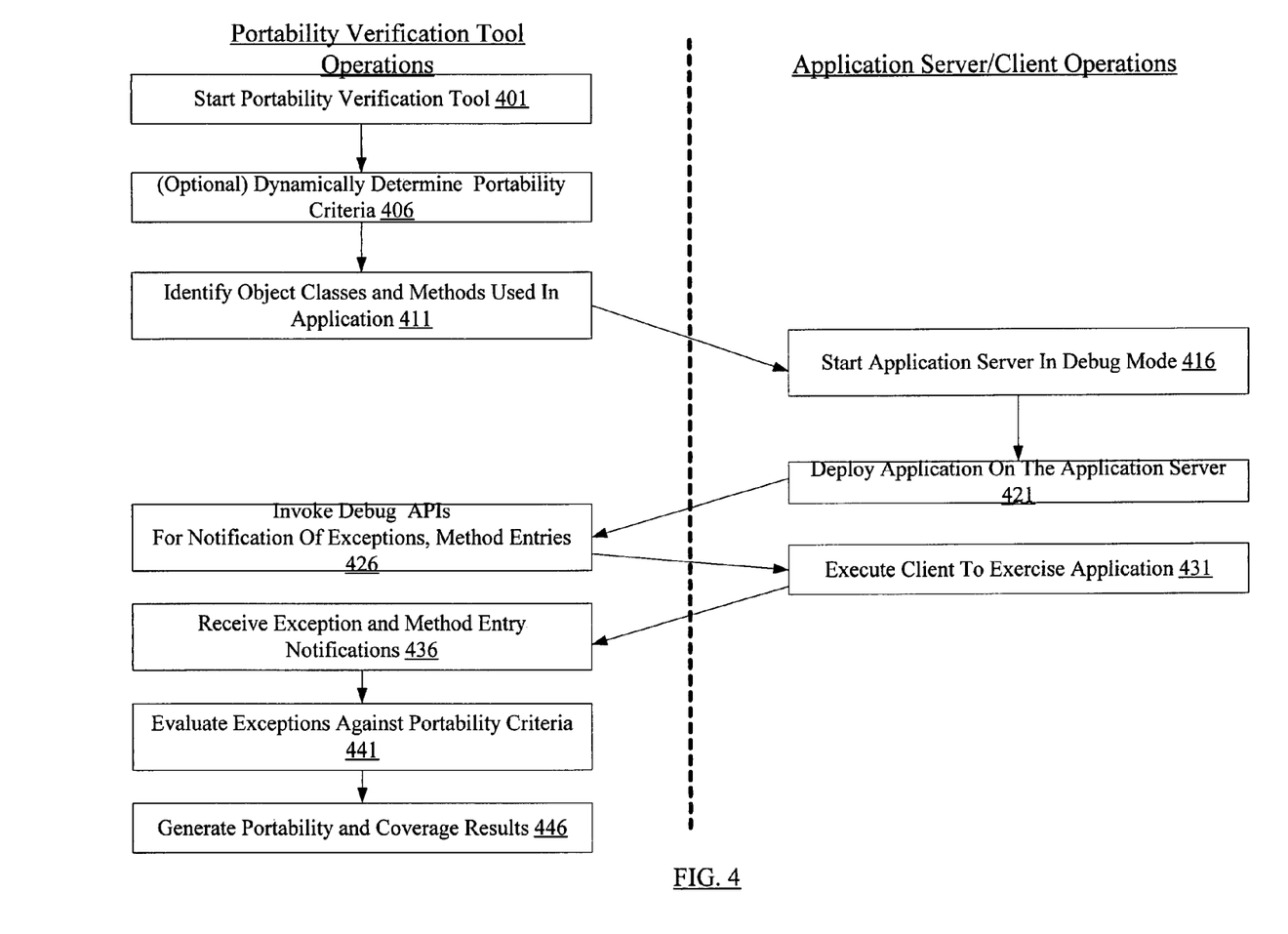
FIG. 4 is a flow diagram illustrating aspects of the operation of a portability verification tool and an application server, according to one embodiment

FIG. 4 is a flow diagram illustrating aspects of the operation of portability verification tool 140 and application server 110, according to one embodiment. After the portability verification tool is started (block 401 of FIG. 4), in some embodiments it may be configured to optionally dynamically determine portability criteria 155 (block 406). For example, as described earlier, the criteria may be read in via a parameter file, which may include a list of criteria specified using a language or format (e.g., XML) understood by the portability verification tool. The ability to specify alternate portability criteria may be especially useful over time, e.g., as standard specifications that may govern portability may evolve. For example, in an implementation where application server 110 implements J2EE™ technology, features and functions that were once considered non-portable in a particular version of a J2EE™ specification may be incorporated into later versions, so that the portability criteria may change with the version of J2EE™ specifications with which the application server is compliant.

Portability verification tool 140 may be configured to determine or identify the set of object classes, Methods and/or functions defined in the application 120 (block 411), e.g., using one or more of the techniques described above, such as inspecting deployment descriptors to identify top-level classes and utilizing reflection APIs to detect other classes and methods defined in the application. The application server 110 may be started up, e.g., in a debug mode (block 416), and the application being analyzed for portability may be deployed thereto (block 421). The portability verification tool 140 may be configured to invoke facilities or functions provided by the debugging interface 130 (such as, for example, the MethodEntryRequest and/or ExceptionRequest APIs described above) to request notifications when certain events occur during the execution of the application (block 426).

With the event notification requests set up, the client 130 may be executed to exercise the application 120 (block 431). As noted earlier, a number of different types of client applications may be used, such as multi-user test scripts generated using a load generating tool, single-user functional tests, etc. Notifications of the occurrence of events for which notification requests were earlier set up, such as method entry notifications and exception notifications, may occur during application execution (block 436). The notifications may be logged or saved in a persistent store or database by portability verification tool 140 in some embodiments for later analysis. After the execution completes, the logged or stored notification information may be analyzed, e.g., to identify occurrences of specific types of exceptions (block 441) that indicate portability criterion violations. A portability and/or coverage report may then be generated as described above (block 446). It is noted that in some embodiments, some of the operations depicted in FIG. 4 may be performed in a different sequence than the sequence illustrated in FIG. 4, or omitted entirely. For example, in one embodiment, the identification of the classes and methods defined in an application 120 may be performed after the application 120 is deployed at the application server, and in another embodiment, code coverage results may not be generated.

Figure 5:
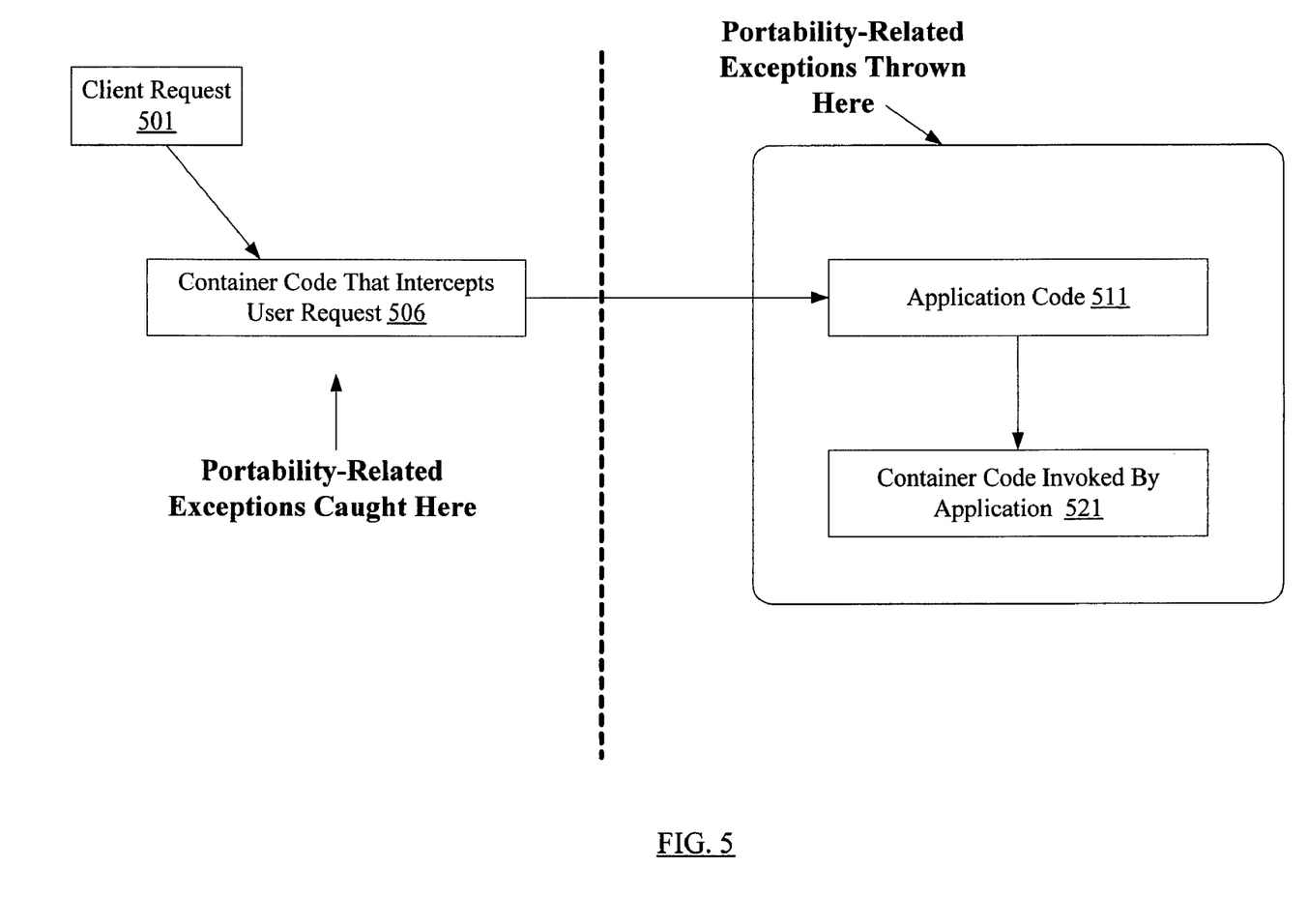
FIG. 5 is a block diagram illustrating exemplary interactions between container code and application code on behalf of a client request at an application server, according to one embodiment.

As described earlier in conjunction with the description of FIG. 2, in some embodiments, an application server 120, such as a J2EE™ server may implement a number of different types of containers to provide support for a variety of commonly-used low-level functions such as multithreading, transaction and state management, resource pooling and the like. In such embodiments, a client request directed at an application 120 may first be received or handled by code for one of the components, which may then invoke application code on behalf of the request. FIG. 5 is a block diagram illustrating exemplary interactions between container code and application code on behalf of a client request at an application server 120, according to one embodiment. As shown, a client request 501 may be intercepted by a first layer of container code 506 (e.g., code for a web container 205 for a client request directed at a JSP or Servlet component). The first layer of container code 506 may then invoke the code 511 of the application component deployed at the container, which may in turn potentially invoke other container code 521 (either within the same container as code 506, or in another container). Portability-related exceptions generated in the application code 511 and the code 521 called from the application code may be caught in the first layer of container code 506 in some embodiments, and notifications for such exceptions may be sent to the portability verification tool 140 for analysis of possible violation of portability criteria.

Figure 6:
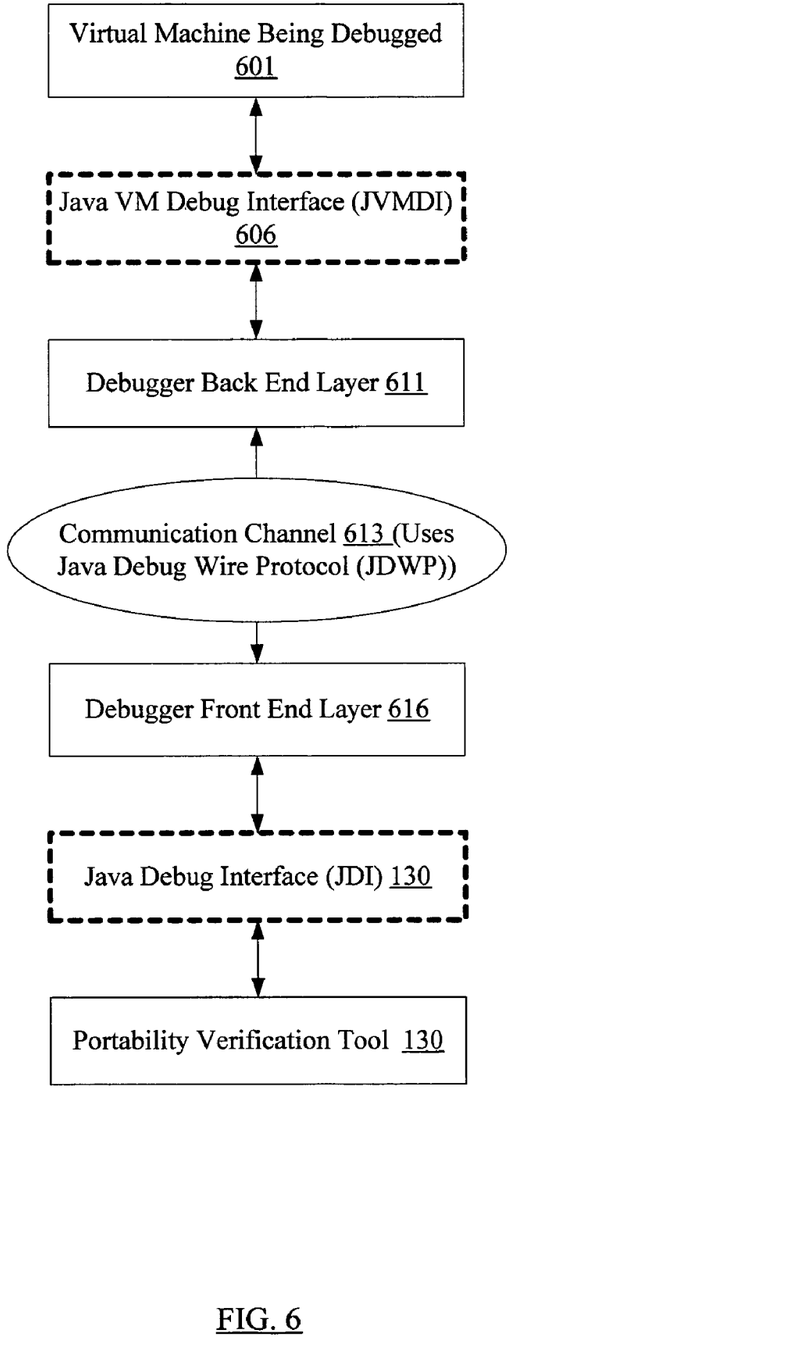
FIG. 6 is a block diagram illustrating various layers of a debugging infrastructure architecture, according to one embodiment.

In some embodiments, the debugging interface 130 supported by application server 110 may be a version of JDI (Java Debugging Interface), as described earlier. In one specific implementation, a version of JDI may be supported by an application server 110 as part of a debugging infrastructure architecture such as the Java Platform Debugger Architecture (JPDA). FIG. 6 is a block diagram illustrating various layers of JPDA according to one embodiment. As shown, JPDA may include two interfaces, JDI 130 and the Java Virtual Machine Debug Interface (JVMDI) 606 DI, a protocol (Java Debug Wire Protocol or JDWP), and two additional software components that link the interfaces together (debugger back end layer 611 and debugger front end layer 616). The architecture may provide standard interfaces to enable Java programming language debugging tools to be easily written without regard to platform specifics such as hardware, operating system and virtual machine implementation, and may describe or specify specific implementation choices for remote and cross-platform debugging. The modularity of the architecture may allow for extensibility and/or customization, e.g., to allow debugging client programs (such as portability verification tool 140) to define and use custom interfaces tailored for a particular application set or customer.

The JVMDI 606 may describe the functionality that must be provided by a Java virtual machine (JVM) in order to enable debugging of Java programming language applications running under that JVM. In a reference implementation of JPDA, for example, JVMDI may be implemented by the Java HotSpot VM provided by Sun Microsystems. The services a VM must provide for debugging may include requests for information (for example, a current stack frame), actions (for example, set a breakpoint), and notification (for example, when a breakpoint has been hit). A debugger may make use of VM information other than this, e.g., using the Java Native Interface (JNI), but the JVMDI 606 is typically the source of all debugger-specific information. Specifying the VM interface in this way may allow any VM vendor to plug easily into the debugging architecture, and may also allow the use of alternate communication channel implementations 613. VM implementations that do not adhere to JVMDI may also provide access via JDWP.

The JDWP defines the format of information and requests transferred between the VM 601 being debugged and the debugger front end layer 616 which implements the Java Debug Interface. JDWP does not require a specific transport mechanism, so a variety of different transport mechanisms such as sockets, serial lines, shared memory, and so on may be used in various embodiments using any suitable communication channel 613. The specification of the protocol allows the VM 601 being debugged and the debugger front-end layer 616 to run under separate VM implementations and/or on separate platforms. It also enables the front-end to be written in a language other than Java. Information and requests sent over JDWP may be formatted as specified in JVMDI 606, but may also include additional information and requests necessitated by bandwidth issues, such as information filtering and batching. In a reference implementation, a module called the back-end debugger layer 611 may be configured to run as an agent of the HotSpot VM and receive JDWP packets from the debugger front end layer 616. The back-end code may execute the commands it receives over the JDWP, calling into the HotSpot VM via JVMDI when necessary. Results may be returned back to the debugger front end layer 616 via JDWP.

In the JPDA architecture depicted in FIG. 6, JDI 130 may provide a remote view of the VM 601 being debugged to the portability verification tool 140 or any other JDI client, such as a debugger, an integrated development environment (IDE), a monitoring tool, etc. JDI 130 may define information and requests at the user code level, and may provide introspective access to a running virtual machine's state, Class, Array, Interface, and primitive types, and instances of those types. JDI 130 may also provide explicit control over a virtual machine's execution.

Figure 7:
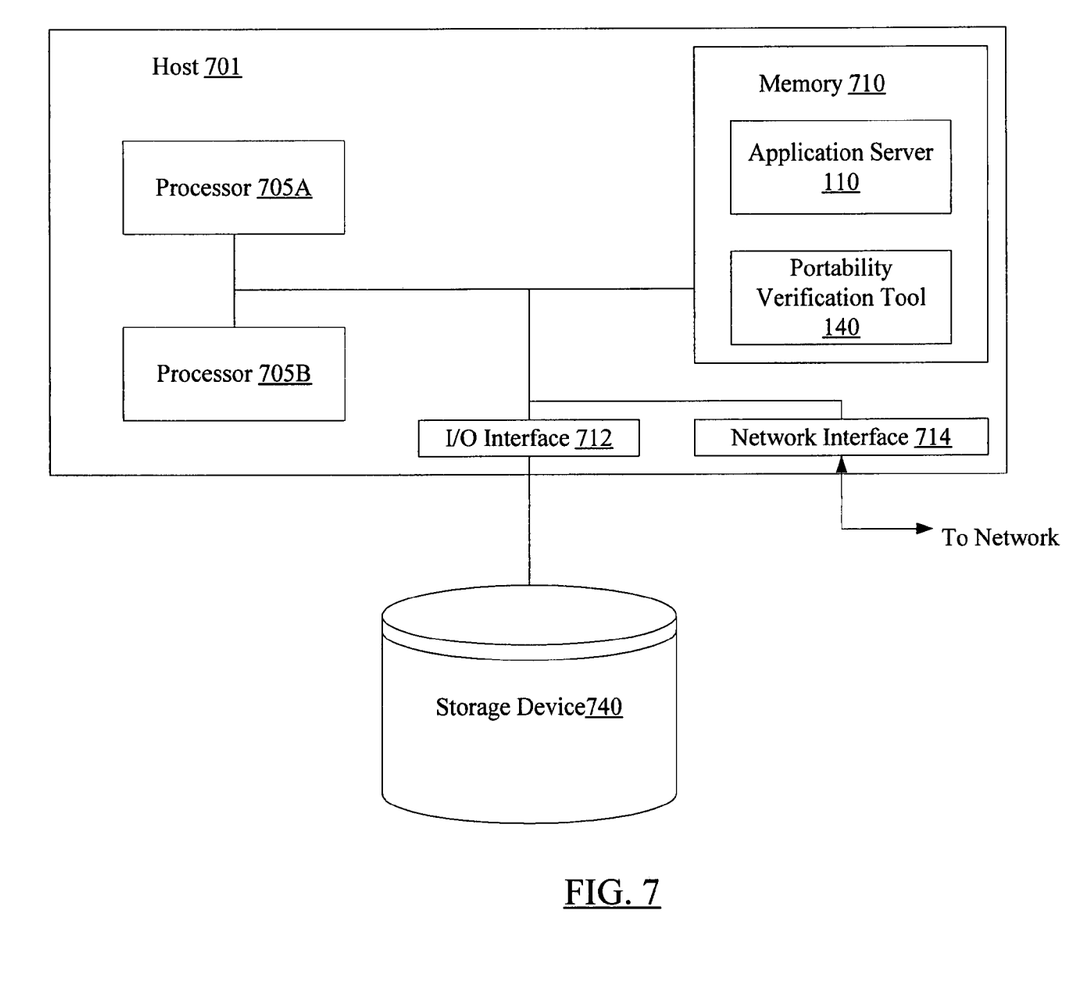
FIG. 7 is a block diagram illustrating a computer host according to one embodiment.

FIG. 7 is a block diagram of a computer host 701 according to one embodiment. As shown host 701 may include one or more processors 705, such as processors 705A and 705B. In various embodiments, processors 705 may be implemented using any desired architecture or chip set, such as the SPARC™ architecture from Sun Microsystems or the x86-compatible architectures from Intel Corporation, Advanced Micro Devices, etc. Program instructions that may be executable to implement the functionality of portability verification tool 140 and/or application server 110 may be partly or fully resident within a memory 710 at a given point in time, and may also be stored on a storage device 740. In various embodiments, portability verification tool 140 may be packaged as a standalone application, or may be packaged along with an application server 110 or included within a suite of software tools. Memory 710 may be implemented using any appropriate medium such as any of various types of RAM (e.g., DRAM, SDRAM, RDRAM, SRAM, etc.). In addition to processors 705 and memory 710, host 701 may also include one or more I/O interfaces 712 providing access to storage devices 740, one or more network interfaces 714 providing access to a network, and the like. Any of a variety of storage devices may be used to store the instructions as well as data for portability verification tool 140 and application server 110 in different embodiments, include any desired type of persistent and/or volatile storage devices, such as individual disks, disk arrays, optical devices such as CD-ROMs, CD-RW drives, DVD-ROMs, DVD-RW drives, flash memory devices, various types of RAM and the like.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a processor; and
a memory storing program instructions executable by the processor to implement:
an application server configured to provide services defined in a particular application services specification, wherein the application server is further configured to support a debugging interface, wherein the debugging interface comprises a plurality of debugging functions;
an application deployed on the application server; and
a portability verification tool configured to invoke the debugging interface during an execution of the application to determine whether the application violates one or more specified portability criteria during the execution of the application, wherein to determine whether the application violates the one or more specified portability criteria the portability verification tool is configured to:
invoke a particular debugging function of the plurality of debugging functions to monitor the execution of the application via the debugging interface for exceptions;
determine that a monitored exception that belongs to a specified category of exceptions is indicative of a violation of the one or more specified portability criteria, wherein the specified category of exceptions includes an exception that is indicative of an invocation by the application of an application server service interface that is not defined in the particular application services specification;
in response to the monitored exception being indicative of a violation of the one or more specified portability criteria, indicate that the application violates the one or more specified portability criteria; and
determine that another monitored exception is not indicative of a violation of the one or more specified portability criteria, wherein a monitored exception that is not indicative of a violation of the one or more specified portability criteria does not cause the portability verification tool to indicate that the application violates the one or more specified portability criteria.

2. The system as recited in claim 1, wherein the application invokes one or more interfaces to application server services during the execution, and wherein a portability criterion of the one or more specified portability criteria includes a requirement that each of the one or more interfaces be defined in a particular version of a standard application server services specification supported by the application server.

3. The system as recited in claim 1, wherein the application invokes one or more external functions during the execution, and wherein a portability criterion of the one or more specified portability criteria includes a requirement that each of the one or more external functions implement an interface defined in a particular version of a standard application programming interface (API) specification.

4. The system as recited in claim 1, wherein the debugging interface is platform-independent.

5. The system as recited in claim 1, wherein the specified category of exceptions includes unchecked exceptions that are not declared in method signatures.

6. The system as recited in claim 1, wherein the application server is configured to provide a reference implementation of application server services defined in the particular application services specification.

7. The system as recited in claim 1, wherein the specified category of exceptions includes exceptions belonging to one or more specified programming language object classes.

8. The system as recited in claim 1, wherein the portability verification tool is further configured to:
identify an exclude list of exceptions; and
if a particular exception monitored using the particular debugging function belongs to the specified category of exceptions, determine that the execution of the application violates the particular portability criterion only if the particular exception is not in the exclude list.

9. The system as recited in claim 1, wherein the application server supports access to objects through one or more containers, wherein the application includes a component deployed to a particular container of the one or more containers, and wherein an exception of the specified category of exceptions is caught in code for the particular container.

10. The system as recited in claim 1, wherein the debugging interface comprises a plurality of debugging functions, and wherein the portability verification tool is further configured to:
identifying a set of functions defined in the application;
invoke a particular debugging function of the plurality of debugging functions to monitor the execution for function invocations; and
generate a coverage analysis report identifying the particular functions of the set of functions that were invoked during the execution.

11. The system as recited in claim 1, wherein the application server is executed within a first virtual machine process, and wherein the portability verification tool is executed within a second virtual machine process.

12. The system as recited in claim 11, wherein the first virtual machine process is executed on a first computer host, and wherein the second virtual machine process is executed on a second computer host.

13. The system as recited in claim 1, wherein the portability verification tool is further configured to provide an interface to specify a portability criterion of the one or more specified portability criteria without modifying source code of the portability verification tool.

14. A computer-implemented method, comprising:
deploying an application on an application server configured to provide services defined in a particular application services specification, wherein the application server is further configured to support a debugging interface, wherein the debugging interface comprises a plurality of debugging functions;
invoking a particular debugging function of the plurality of debugging functions of the debugging interface during an execution of the application to make a determination whether the application violates one or more specified portability criteria during the execution of the application;
monitoring the execution of the application via the debugging interface for exceptions;
determining that a monitored exception that belongs to a specified category of exceptions is indicative of a violation of the one or more specified portability criteria, wherein the specified category of exceptions includes an exception that is indicative of an invocation by the application of an application server service interface that is not defined in the particular application services specification;
in response to the monitored exception being indicative of a violation of the one or more specified portability criteria, indicating that the application violates the one or more specified portability criteria;
determining that another monitored exception is not indicative of a violation of the one or more specified portability criteria, wherein a monitored exception that is not indicative of a violation of the one or more specified portability criteria does not cause an indication that the application violates the one or more specified portability criteria; and
generating a portability verification report including a result of the determination.

15. The method as recited in claim 14, wherein the debugging interface is platform-independent.

16. The method as recited in claim 14, further comprising:
identifying an exclude list of exceptions; and
making the determination that the execution of the application violates the particular portability criterion if the particular monitored exception belongs to the specified category of exceptions and is not in the exclude list.

17. The method as recited in claim 14, wherein the debugging interface comprises a plurality of debugging functions, the method further comprising:
identifying a set of functions defined within the application;
invoking a particular debugging function of the plurality of debugging functions to monitor the execution for function invocations; and
generating a coverage analysis report identifying the particular functions of the set of functions that were invoked during the execution.

18. A computer readable medium comprising program instructions, wherein the instructions are computer-executable to:
deploy an application on an application server configured to provide services defined in a particular application services specification, wherein the application server is further configured to support a debugging interface, wherein the debugging interface comprises a plurality of debugging functions;
invoke a particular debugging function of the plurality of debugging functions of the debugging interface during an execution of the application to make a determination whether the application violates one or more specified portability criteria during the execution of the application;
monitor the execution of the application via the debugging interface for exceptions;
determine that a monitored exception that belongs to a specified category of exceptions is indicative of a violation of the one or more specified portability criteria, wherein the specified category of exceptions includes an exception that is indicative of an invocation by the application of an application server service interface that is not defined in the particular application services specification;
in response to the monitored exception being indicative of a violation of the one or more specified portability criteria, indicate that the application violates the one or more specified portability criteria; and
determine that another monitored exception is not indicative of a violation of the one or more specified portability criteria, wherein a monitored exception that is not indicative of a violation of the one or more specified portability criteria does not cause the portability verification tool to indicate that the application violates the one or more specified portability criteria;
generate a portability verification report including a result of the determination.

19. The computer readable medium as recited in claim 18, wherein the debugging interface comprises a plurality of debugging functions, wherein the instructions are further computer-executable to:
identify a set of functions defined within the application;
invoke a particular debugging function of the plurality of debugging functions to monitor the execution for function invocations; and
generate a coverage analysis report identifying the particular functions of the set of functions that were invoked during the execution.

20. A system, comprising:
a processor; and
a memory coupled to the processor and configured to store program instructions executable by the processor to implement a portability verification tool configured to:
invoke a particular debugging function of a debugging interface supported by an application server during an execution of an application deployed at the application server to determine whether the application violates one or more specified portability criteria during the execution, wherein the application server is configured to provide services defined in a particular application services specification, and wherein the debugging interface comprises a plurality of debugging functions;
monitor the execution of the application via the debugging interface for exceptions;

determine that a monitored exception that belongs to a specified category of exceptions is indicative of a violation of the one or more specified portability criteria, wherein the specified category of exceptions includes an exception that is indicative of an invocation by the application of an application server service interface that is not defined in the particular application services specification;

in response to the monitored exception being indicative of a violation of the one or more specified portability criteria, indicate that the application violates the one or more specified portability criteria; and determine that another monitored exception is not indicative of a violation of the one or more specified portability criteria, wherein a monitored exception that is not indicative of a violation of the one or more specified portability criteria does not cause the portability verification tool to indicate that the application violates the one or more specified portability criteria;

generate a portability verification report including a result of the determination.

\* \* \* \* \*